United States Patent
Matsuda et al.

(10) Patent No.: US 12,228,911 B2
(45) Date of Patent: Feb. 18, 2025

(54) CONTROL APPARATUS OF MACHINING DEVICE AND CONTROL METHOD OF THE SAME

(71) Applicant: Mazda Motor Corporation, Hiroshima (JP)

(72) Inventors: Junya Matsuda, Aki-gun (JP); Tomonori Saeki, Aki-gun (JP); Keiichi Shimizu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 705 days.

(21) Appl. No.: 17/595,152

(22) PCT Filed: Apr. 20, 2020

(86) PCT No.: PCT/JP2020/017043
§ 371 (c)(1),
(2) Date: Nov. 10, 2021

(87) PCT Pub. No.: WO2020/235280
PCT Pub. Date: Nov. 26, 2020

(65) Prior Publication Data
US 2022/0260972 A1 Aug. 18, 2022

(30) Foreign Application Priority Data
May 21, 2019 (JP) .................................. 2019-095454

(51) Int. Cl.
*G05B 19/4155* (2006.01)
*B23Q 15/18* (2006.01)

(52) U.S. Cl.
CPC ......... *G05B 19/4155* (2013.01); *B23Q 15/18* (2013.01); *G05B 2219/35398* (2013.01)

(58) Field of Classification Search
CPC ....... B23Q 15/18; B23C 3/02; B23C 2215/24; B23B 41/12; G05B 19/4155;
(Continued)

(56) References Cited

U.S. PATENT DOCUMENTS

| 5,623,857 A * | 4/1997 | Sakuraba ............... B23Q 15/18 82/900 |
| 11,660,692 B2 * | 5/2023 | Takemoto .............. B23H 11/00 700/162 |

(Continued)

FOREIGN PATENT DOCUMENTS

| CN | 108628256 A * | 10/2018 | ........... G05B 19/182 |
| DE | 277418 A1 * | 4/1990 | |

(Continued)

OTHER PUBLICATIONS

CN-108628256-A translation (Year: 2024).*
(Continued)

*Primary Examiner* — Kyle T Johnson
(74) *Attorney, Agent, or Firm* — Alleman Hall & Tuttle LLP

(57) ABSTRACT

A machining center processes a section not to be corrected of a workpiece and a crankshaft bearing hole in a different position from the section not to be corrected and which is separated from an upper deck surface of the workpiece. The machining center supplies a coolant to the hole during processing and detects a temperature of the coolant. A control apparatus estimates the temperature of the coolant when a predetermined time elapses from a start of the processing to be a temperature of the workpiece, calculates a deformation amount of the workpiece due to thermal expansion, corrects a position of the hole with respect to the upper deck surface based on the deformation amount, and starts processing of the hole after the predetermined time. The predetermined time ends when a difference between a (Continued)

temperature near the hole and the temperature of the coolant falls within a predetermined range.

9 Claims, 11 Drawing Sheets

(58) Field of Classification Search
CPC ............ G05B 2219/35398; G05B 2219/49219; G05B 19/404; G05B 2219/37584
See application file for complete search history.

(56) References Cited

U.S. PATENT DOCUMENTS

| | | | | |
|---|---|---|---|---|
| 2010/0272529 | A1* | 10/2010 | Rozzi | B23C 5/28 408/56 |
| 2011/0232120 | A1* | 9/2011 | Tullmann | G05B 19/404 33/701 |
| 2013/0025124 | A1* | 1/2013 | Nagel | B24B 33/022 408/1 R |
| 2015/0231751 | A1* | 8/2015 | Tullman | B23Q 11/128 165/137 |
| 2016/0001410 | A1* | 1/2016 | Koyama | B23Q 11/0007 700/170 |
| 2016/0236351 | A1* | 8/2016 | Kunihiro | B25J 9/1697 |
| 2017/0023417 | A1* | 1/2017 | Koyama | G05B 19/404 |
| 2018/0181103 | A1* | 6/2018 | Mizoguchi | B23Q 11/0007 |
| 2018/0276570 | A1* | 9/2018 | Watanabe | G05B 19/042 |
| 2022/0134562 | A1* | 5/2022 | Graham | B25J 9/1661 700/245 |
| 2022/0260972 | A1* | 8/2022 | Matsuda | B23Q 15/18 |

FOREIGN PATENT DOCUMENTS

| | | | | |
|---|---|---|---|---|
| EP | | 0735443 A2 | * 10/1996 | |
| EP | | 4296808 A1 | * 12/2023 | ......... B23Q 11/0007 |
| JP | | 4117950 B2 | * 7/2008 | |
| JP | | 2013094902 A | 5/2013 | |
| JP | | 2014100724 A | * 6/2014 | |

OTHER PUBLICATIONS

EP-0735443-A2 translation (Year: 1993).*
JP-2014100724-A translation (Year: 2014).*
JP-4117950-B2 translation (Year: 2008).*
High Speed Machining of Engine Block with PCDN and Mixed Ceramic Inserts (Year: 2002).*
Investigation of Cutting Temperature for AiSi H13 in High Speed End Milling (Year: 2016).*
Thermal Issues in Machine Tools (Year: 2012).*
DD-277418-A1 translation (Year: 1990).*
FEM based prediction of workpiece transient temperature distribution during milling (Year: 2008).*
Experimental and finite element analysis of temperature and energy partition to the workpiece (Year: 2013).*

* cited by examiner

CONTROL APPARATUS OF MACHINING DEVICE AND CONTROL METHOD OF THE SAME

TECHNICAL FIELD

The present disclosure relates to a control apparatus of a machining device and a control method of the same.

BACKGROUND ART

In related art, a grinding target value of a grinder has been corrected by using a temperature of a grinding liquid (coolant) (for example, see Patent Literature 1).

Patent Literature 1 discloses a technique in which in a case where a change occurs to a grinding liquid temperature measured by a temperature sensor, a correction value of a grinding target value is computed based on the amount of the change, and the grinding target value of a grinder is corrected based on the correction value.

CITATION LIST

Patent Literature

Patent Literature 1: Japanese Patent Laid-Open No. 2013-94902

SUMMARY OF INVENTION

Technical Problem

However, because a temperature of a coolant is comparatively stable during processing work, actually, the temperature of the coolant possibly does not accurately reflect a fluctuation in a workpiece temperature, and there has been room for improvement in terms of an improvement in precision of a processing position.

Accordingly, an object of the present disclosure is to provide a control apparatus of a machining device and a control method of the same that can improve precision of a processing position.

Solution to Problem

To solve the above problem, a control apparatus of a machining device according to a first technique disclosed herein is a control apparatus of a machining device processing a first section of a workpiece and a second section in a position which is different from a position of the first section and which is apart from a reference surface of the workpiece in order of the first section and the second section, the machining device including a coolant supply apparatus which supplies a coolant to the second section of the workpiece during processing work and a temperature detection apparatus which detects a temperature of the coolant, the control apparatus including: a calculation unit which estimates the temperature of the coolant at a time when or after a predetermined time elapses from a start of the processing work to be a temperature of the workpiece and calculates a deformation amount of the workpiece due to thermal expansion; a correction unit which corrects a processing position of the second section with respect to the reference surface based on the deformation amount; and a command unit which starts processing of the second section in the corrected processing position when or after the predetermined time elapses, wherein the predetermined time is a time defined in advance from the start of the processing work until a difference between a temperature of a vicinity of the second section of the workpiece and the temperature of the coolant falls within a predetermined range.

In a case where processing work of a workpiece by a machining device is performed, precision of a processing position of the workpiece has been improved by correcting a jig position or the like on the machining device side. However, the temperature of the workpiece rises due to the processing work of the workpiece, the workpiece itself thermally expands, and a deviation can occur to the processing position. Specifically, in a machining device processing a first section and a second section, the temperature of the workpiece rises due to processing of the first section and the second section, and the workpiece thermally expands. Then, a deviation occurs in a processing position of the second section at a position apart from a reference surface. Further, when the second section is processed before the first section, the temperature of the workpiece rises due to processing of the second section itself. Thus, a fluctuation range of a workpiece temperature becomes large, and a deviation in the processing position occurs during processing of the second section. It has been difficult to handle such a deviation in the processing position due to thermal expansion of the workpiece itself by correction of the jig position or the like on the machining device side. Further, because it is difficult to directly measure the temperature of the workpiece during the processing work, it has been difficult to correct the processing position of the workpiece based on the workpiece temperature.

The inventors of the present application have found that the temperature of the workpiece which rises through processing of the first section after a start of the processing work soon becomes close to the temperature of a coolant and a time from the start of the processing work until the temperature of the workpiece becomes close to the temperature of the coolant is almost constant regardless of an ambient temperature. In this configuration, the temperature of the coolant at a time when or after the predetermined time has elapsed from the start of the processing work is estimated to be the temperature of the workpiece, the deformation amount of the workpiece is calculated, and the processing position of the second section is corrected based on the deformation amount. Accordingly, without measuring the temperature of the workpiece itself, the processing position of the second section can be corrected more accurately in consideration of a thermal expansion amount of the workpiece. Further, in this configuration, processing of the second section is started after the temperature of the workpiece becomes close to the temperature of the coolant. Accordingly, a fluctuation in the workpiece temperature during processing of the second section is small, and a deviation in the processing position becomes small. Consequently, precision of the processing position of the second section can be enhanced.

In the first technique, a second technique is characterized in that the predetermined range of the difference between the temperature of the vicinity of the second section of the workpiece and the temperature of the coolant is within ±1° C.

An error between the temperature of the coolant and the temperature of the workpiece is caused to fall within ±1° C., and precision of the processing position of the second section can thereby further be enhanced.

In the first or second technique, a third technique is characterized in that the control apparatus includes a time measurement apparatus which measures time from the start of the processing work, and the command unit causes the machining device to start processing of the second section by using, as a trigger, a measurement signal of the time measurement apparatus, the measurement signal indicating a lapse of the predetermined time.

The measurement signal of the time measurement apparatus is used as the trigger, and a start timing of processing of the second section can thereby more easily be controlled.

In any one of the first to third techniques, a fourth technique is characterized in that the workpiece is a cylinder block of an engine, the reference surface is an upper deck surface as a fastening surface to a cylinder head, and the second section is a crankshaft bearing hole.

In this configuration, precision in distance and dimension between the upper deck surface and the crankshaft bearing hole in the cylinder block is improved. Accordingly, an error in a compression ratio of an engine due to precision of the processing position of the crankshaft bearing hole can be reduced.

In the fourth technique, a fifth technique is characterized in that the machining device includes a first tool and a second tool for performing processing of the crankshaft bearing hole, the second tool having a whole length longer than that of the first tool, and the command unit causes the machining device to start processing of the crankshaft bearing hole by using the first tool and to subsequently perform additional processing of the crankshaft bearing hole by using the second tool.

Because the crankshaft bearing hole has a shape which is long in a cylinder array direction, a processing tool having a long whole length is needed for this processing. However, when processing of the crankshaft bearing hole is performed by using a long processing tool from the beginning, it becomes difficult to secure accuracy of the processing position due to sagging or the like of a processing tool. In this configuration, initial processing of the long crankshaft bearing hole is performed by the comparatively short first tool, and precision of the processing position can thereby be improved. Further, the initial processing is performed by the comparatively short first tool, a guide hole for the long second tool is thereby formed, and precision of the subsequent additional processing is improved.

A control method of a machining device according to a sixth technique disclosed herein is a control method of a machining device processing a first section of a workpiece and a second section in a position which is different from a position of the first section and which is apart from a reference surface of the workpiece in order of the first section and the second section, the machining device including a coolant supply apparatus which supplies a coolant to the second section of the workpiece during processing work and a temperature detection apparatus which detects a temperature of the coolant, the control method including: a calculation step of estimating the temperature of the coolant at a time when or after a predetermined time elapses from a start of the processing work to be a temperature of the workpiece and calculating a deformation amount of the workpiece due to thermal expansion; a processing position correction step of correcting a processing position of the second section with respect to the reference surface based on the deformation amount; and a second section processing step of starting processing of the second section in the corrected processing position after the processing position correction step, the control method being characterized in that the predetermined time is a time defined in advance from the start of the processing work until a difference between a temperature of a vicinity of the second section of the workpiece and the temperature of the coolant falls within a predetermined range.

In this configuration, the temperature of the coolant at a time when or after the predetermined time has elapsed from the start of the processing work is estimated to be the temperature of the workpiece, the deformation amount of the workpiece is calculated, and the processing position of the second section is corrected based on the deformation amount. Accordingly, without measuring the temperature of the workpiece itself, the processing position of the second section can be corrected more accurately in consideration of a thermal expansion amount of the workpiece. Consequently, precision of the processing position of the second section can be enhanced.

In the sixth technique, a seventh technique is characterized in that the predetermined range of the difference between the temperature of the vicinity of the second section of the workpiece and the temperature of the coolant is within $\pm 1°$ C.

An error between the temperature of the coolant and the temperature of the workpiece is caused to fall within $\pm 1°$ C., and precision of the processing position of the second section can thereby further be enhanced.

In the sixth or seventh technique, an eighth technique is characterized in that the workpiece is a cylinder block of an engine, the reference surface is an upper deck surface as a fastening surface to a cylinder head, and the second section is a crankshaft bearing hole.

In this configuration, precision in distance and dimension between the upper deck surface and the crankshaft bearing hole in the cylinder block is improved. Accordingly, an error in the compression ratio of the engine due to precision of the processing position of the crankshaft bearing hole can be reduced.

In the eighth technique, a ninth technique is characterized in that the machining device includes a first tool and a second tool for performing processing of the crankshaft bearing hole, the second tool having a whole length longer than that of the first tool, in the second section processing step, processing of the crankshaft bearing hole is performed by using the first tool, and additional processing of the crankshaft bearing hole is subsequently performed by using the second tool.

In this configuration, initial processing of the long crankshaft bearing hole is performed by the comparatively short first tool, and precision of the processing position can thereby be improved. Further, the initial processing is performed by the comparatively short first tool, a guide hole for the long second tool is thereby formed, and precision of the subsequent additional processing is improved.

Advantageous Effects of Invention

As described above, in the present disclosure, a temperature of a coolant at a time when or after a predetermined time elapses from a start of processing work is estimated to be a temperature of a workpiece, a deformation amount of the workpiece is calculated, and a processing position of a second section is corrected based on the deformation amount. Accordingly, without measuring the temperature of the workpiece itself, the processing position of the second section can be corrected more accurately in consideration of a thermal expansion amount of the workpiece. Consequently, precision of the processing position of the second section can be enhanced.

DESCRIPTION OF EMBODIMENT

Embodiments of the present disclosure will hereinafter be described in detail based on drawings. The following descriptions of preferable embodiments are basically only raised as examples and are not intended to restrict the present disclosure, applications thereof, or uses thereof at all.

First Embodiment

<Machining Center>

Figure 1:
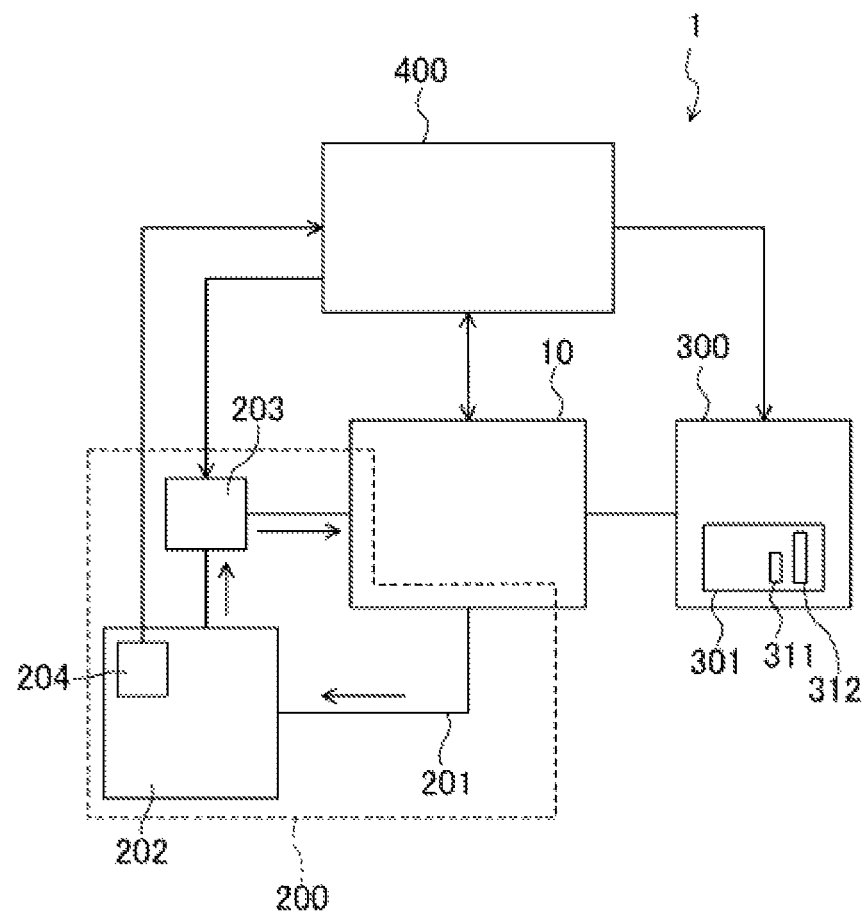
FIG. 1 is a diagram illustrating a configuration of a machining center.

FIG. 1 illustrates a configuration of a machining center 1 (machining device) according to the present embodiment. The machining center 1 includes a machining center body 10, a coolant supply apparatus 200, an automatic tool changer (ATC) 300, and a control apparatus 400.

<<Machining Center Body>>

Figure 2:
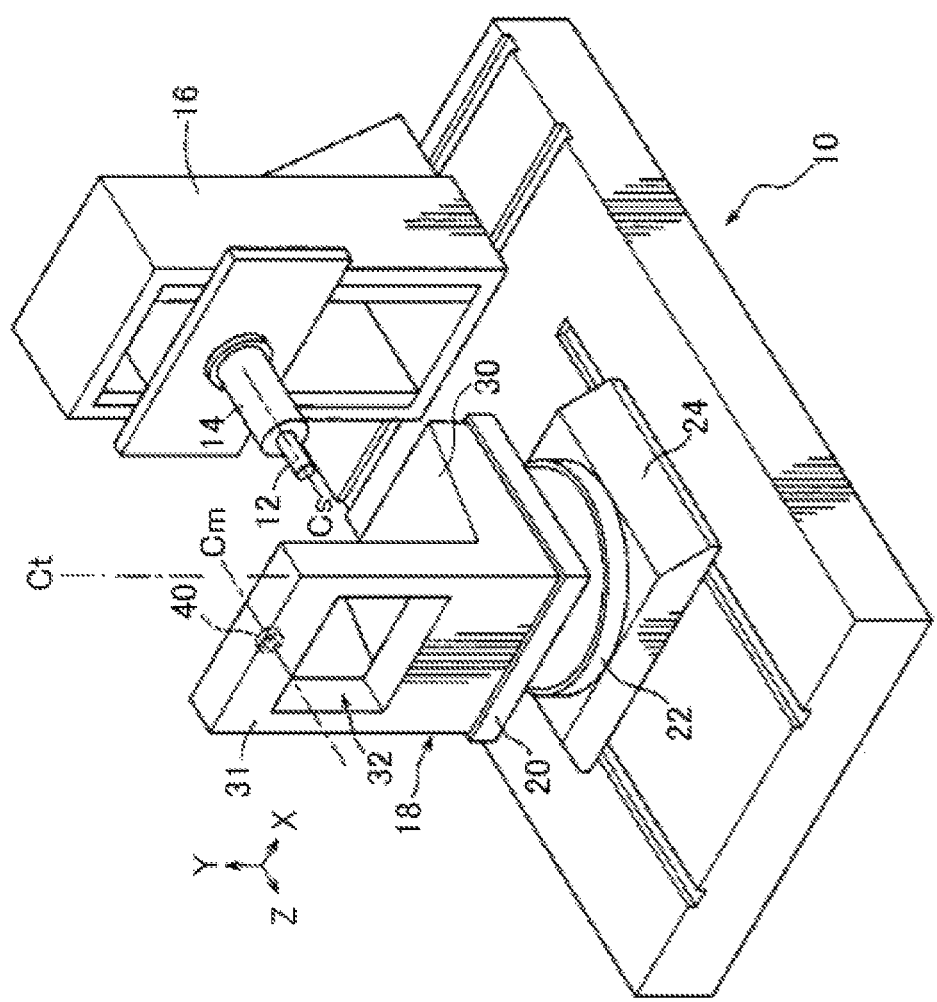
FIG. 2 is a perspective view illustrating a machining center body.
Figure 3:
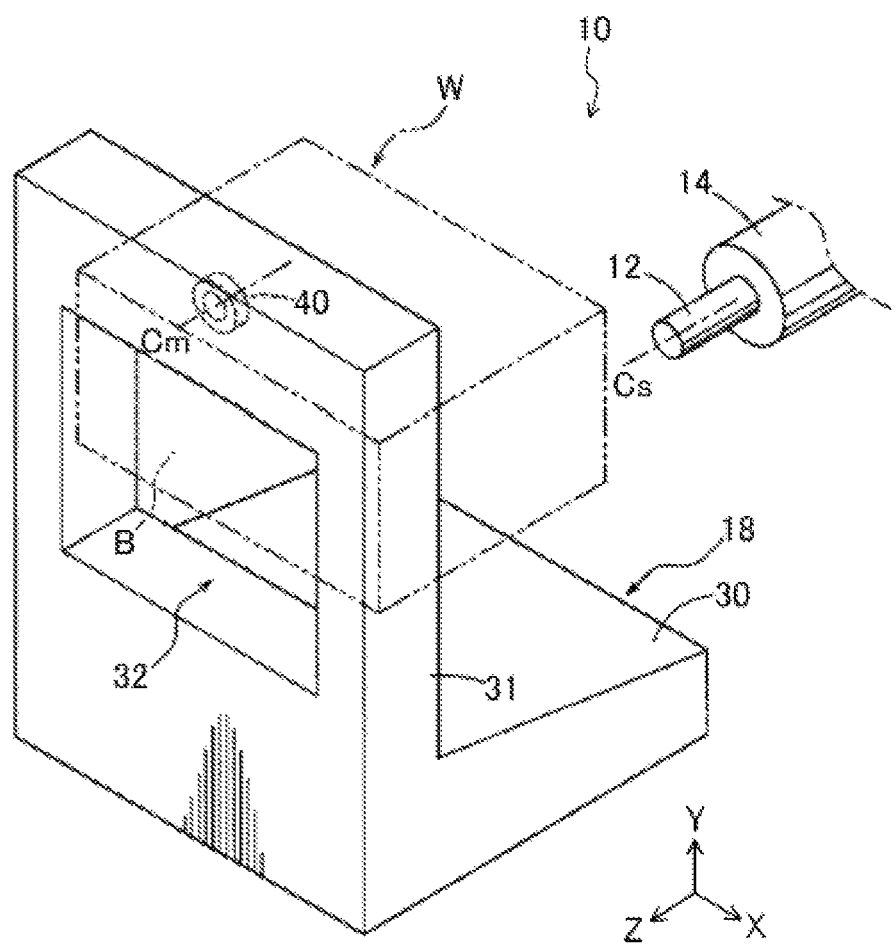
FIG. 3 is an enlarged view of a part around a jig in FIG. 2 and indicates a workpiece positioned by the jig by two-dot chain lines.

FIG. 2 illustrates one example of the machining center body 10. Further, FIG. 3 is an enlarged view of a part around a jig 18 in FIG. 2. In FIG. 3, a workpiece W indicated by two-dot chain lines is positioned by the jig 18.

The machining center body 10 has an XYZ coordinate system formed with an X axis, a Y axis, and a Z axis as a machine coordinate system. An X-axis direction and a Z-axis direction are horizontal directions, and a Y-axis direction is a perpendicular direction.

The machining center body 10 includes a spindle 14, a column 16, a processing table 20, a rotation mechanism 22, and a feed mechanism 24. On the spindle 14, for example, various tools 12 such as a drill, an end mill, and a milling cutter are mounted. The spindle 14 rotates the tool 12 around a rotation center line Cs extending in the Z-axis direction. The column 16 moves the spindle 14 in the Y-axis direction and in the X-axis direction as well. The processing table 20 is a component on which the jig 18 positioning the workpiece W is placed. The rotation mechanism 22 rotates the processing table 20 around, as a center, a rotation center line Ct extending in the Y-axis direction. The feed mechanism 24 moves the rotation mechanism 22 in the Z-axis direction.

As illustrated in FIG. 2 and FIG. 3, the jig 18 is an angle plate jig which has a base 30, a jig body 31, and an opening 32. The base 30 is fixed to an upper surface of the processing table 20 (see FIG. 2). The jig body 31 has a plate shape and is formed to stand upright on the base 30. The opening 32 is provided to pass through the jig body 31 in its thickness direction. The jig 18 has a plurality of clamping apparatuses (not illustrated) in addition to the base 30, the jig body 31, and the opening 32. The clamping apparatuses are for clamping the workpiece W and for retaining its position. Further, the jig 18 has a cylindrical master ring 40 which is provided on an upper side of the opening 32 in the jig body 31. The master ring 40 is used for correction of a coordinate system of the machining center body 10 in a coordinate system correction step S1 of a control method described later. Note that as illustrated in FIG. 2 and FIG. 3, a center line of the master ring 40 will be denoted as Cm.

As illustrated in FIG. 3, the workpiece W is processed in a state where that is retained by the jig 18. Note that in the present embodiment, the workpiece W is a cylinder block of an engine, and the workpiece W is fixed to the jig 18 such that an upper deck surface 111 described later comes to the position of a reference character B in FIG. 3. In the machining center body 10, the relative position of the workpiece W to the spindle 14 is changed by movement of the spindle 14 in the X-axis direction and the Y-axis direction by the column 16, movement of the workpiece W in the Z-axis direction by the jig 18, and rotation of the workpiece W around the rotation center line Ct by the rotation mechanism 22. Accordingly, the workpiece W can be processed from all directions.

Further, the machining center body 10 is a numerically-controlled machining device. That is, the machining center body 10 is configured to perform various processes in order of processed sections following processing program data 421 which are created in advance in accordance with the workpiece W and will be described later.

<<Coolant Supply Apparatus>>

The coolant supply apparatus 200 is for supplying a coolant to the workpiece W during processing work and for thereby inhibiting an excessive temperature rise of the workpiece W. The coolant is supplied to the whole workpiece W including the processed sections of the workpiece W, that is, sections not to be corrected (first sections) and a section to be corrected (second section) which will be described later.

Specifically, for example, as illustrated in FIG. 1, the coolant supply apparatus 200 includes a tank 202, a supply path 201, a pump 203, and a temperature sensor 204 (temperature detection apparatus). The tank 202 stores the coolant. The supply path 201 connects the machining center body 10 and the tank 202 together such that the coolant circulates between both of those. The pump 203 is provided on the supply path 201 and generates a flow of the coolant. The temperature sensor 204 is arranged in the tank 202 and detects the temperature of the coolant stored in the tank 202.

The coolant sent into the machining center body 10 through the supply path 201 is supplied to the workpiece W from a nozzle (not illustrated) arranged around the workpiece W in the machining center body 10, a distal end of the spindle 14, a distal end of the tool 12, or the like, for example. The coolant supplied to the workpiece W is returned to the supply path 201 through a drain (not illustrated) provided in a lower portion of the machining center body 10.

<<Automatic Tool Changer (ATC)>>

The ATC 300 is for changing the tools 12 to be attached to the spindle 14. As illustrated in FIG. 1, the ATC 300 includes an accommodation portion 301 including a plurality of tool magazines in which the above-described various tools 12 stand by. The ATC 300 changes the tool 12 attached to the spindle 14 to another tool 12 standing by in the tool magazine following the processing program data 421 described later (following a tool number in the processing program data 421). Accordingly, the machining center body 10 executes various processes by using various tools 12. Further, the accommodation portion 301 houses tools 12 other than tools for processing. Specifically, an example may be a touch sensor or the like which is used in the coordinate system correction step S1 described later.

<<Control Apparatus>>

Figure 4:
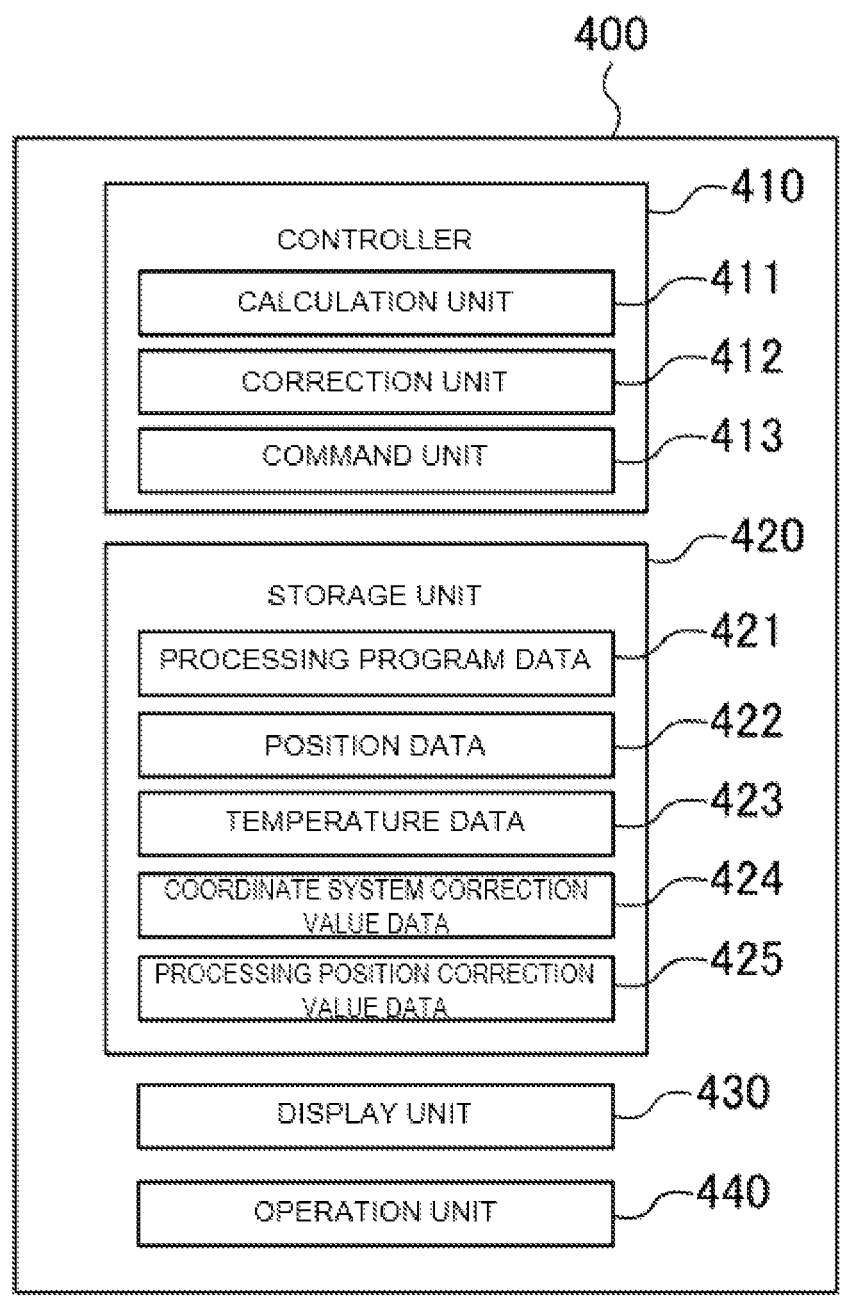
FIG. 4 is a diagram illustrating a configuration of a control apparatus.

As illustrated in FIG. 4, the control apparatus 400 includes a controller 410, a storage unit 420, a display unit 430, and an operation unit 440. The controller 410 and the storage unit 420 are configured with a general-purpose computer or the like, for example. The display unit 430 and the operation unit 440 are configured with a display, a keyboard, a liquid crystal touch panel, and so forth, for example.

The controller 410 includes a calculation unit 411, a correction unit 412, and a command unit 413. The storage unit 420 stores information requested for actions of the machining center body 10, specifically, for example, various kinds of data including the processing program data 421, position data 422, temperature data 423, coordinate system correction value data 424, processing position correction value data 425, and so forth.

The processing program data 421 are numerical control program data and are described to sequentially perform a series of processing works for the workpiece W by the machining center 1, which will be described later. In particular, the processing program data 421 are described to process the sections not to be corrected of the workpiece W, which will be described later, and a crankshaft bearing hole 130 in this order. Specific contents of the other data will be described in items of the control method described later.

<<Workpiece>>

Figure 5:
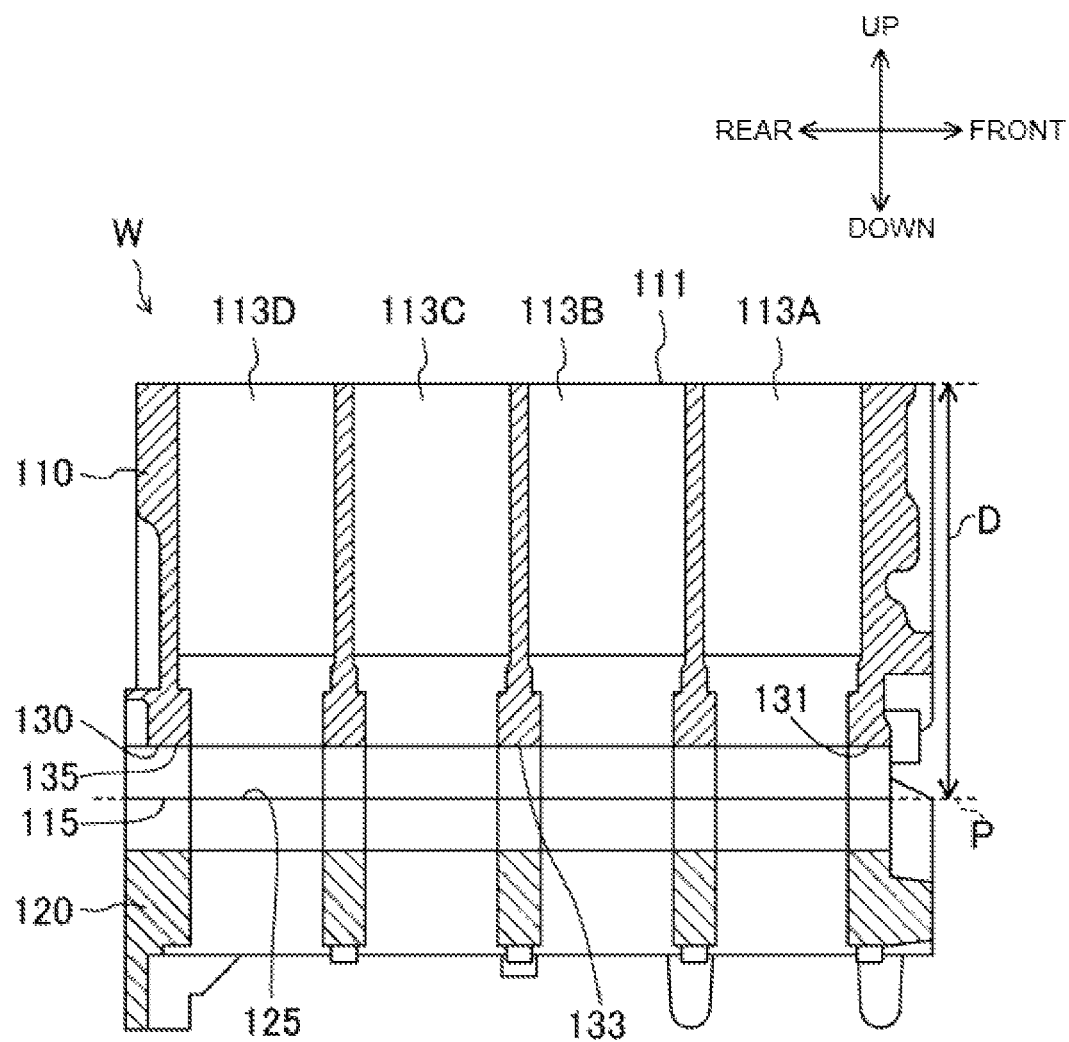
FIG. 5 is a cross-sectional view illustrating one example of a cylinder block to be processed.

As illustrated in FIG. 5, the workpiece W to be processed is a cylinder block of an in-line four-cylinder engine for an automobile. The cylinder block includes four cylinder bores 113A, 113B, 113C, and 113D.

The cylinder block includes an upper block 110 and a lower block 120. The upper block 110 and the lower block 120 are joined to each other on a lower surface 115 of the upper block 110 and an upper surface 125 of the lower block 120. In a joined state, in the vicinity of joined surfaces, the crankshaft bearing hole 130 (second section) for arranging a crankshaft C illustrated as an example in FIG. 6 is provided.

Figure 6:
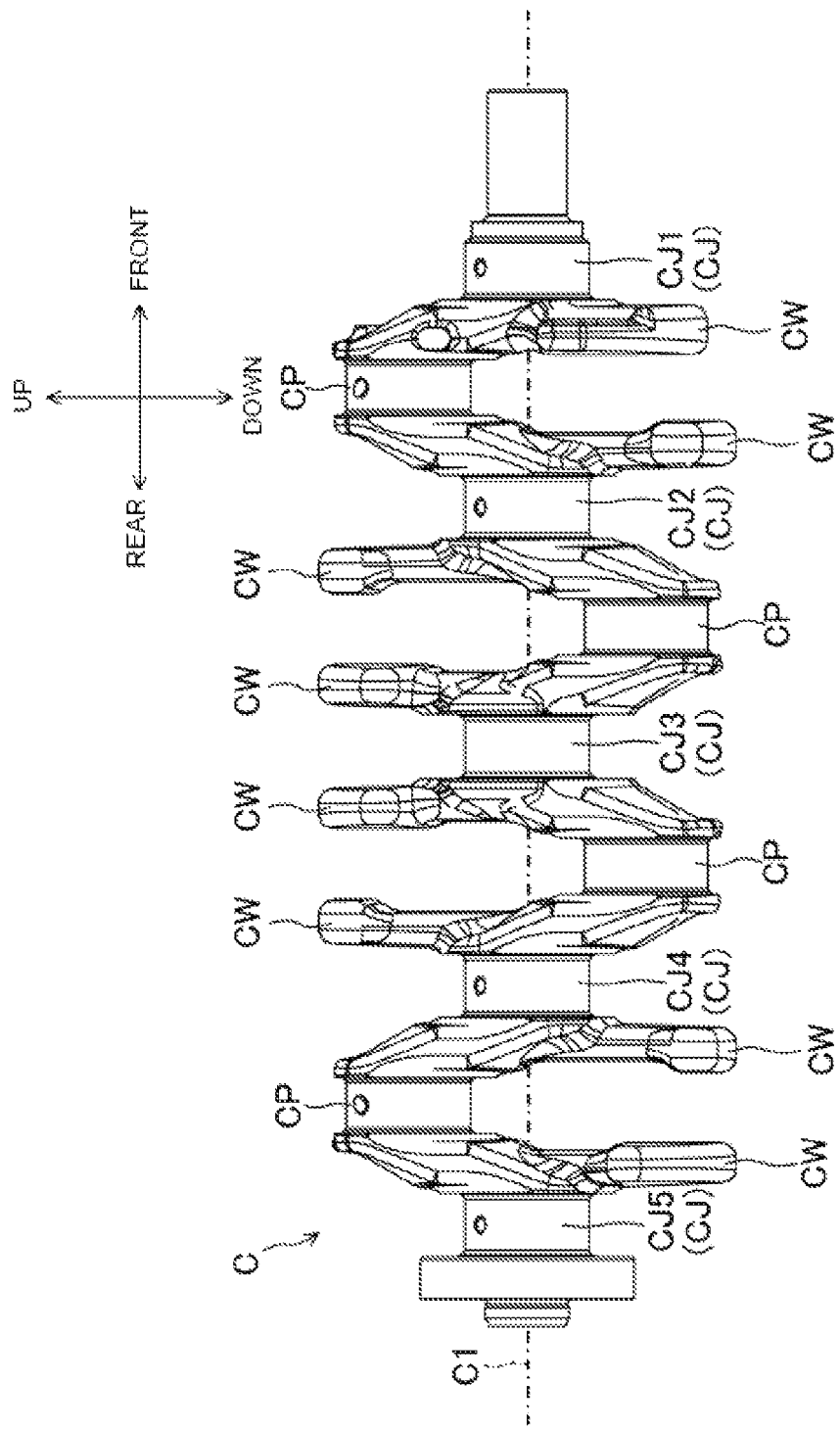
FIG. 6 is a side view illustrating one example of a crankshaft.

Note that in the present specification, for convenience, it is assumed that directions of the workpiece W and the crankshaft C are provided as illustrated in FIG. 5 and FIG. 6. That is, the upper block 110 side of the cylinder block is set as an upper side, the lower block 120 side is set as a lower side, an output side is set as a front side, and the opposite side to the output side is set as a rear side.

The crankshaft C illustrated in FIG. 6 includes crank pins CP with which connecting rods not illustrated are connected, counterweights CW, and crank journals CJ. The crankshaft C is arranged in the crankshaft bearing hole 130 such that a center axis Cl of the crankshaft C agrees with a center axis P of the crankshaft bearing hole 130 and positions of the crank pins CP respectively correspond to the cylinder bores 113A, 113B, 113C, and 113D.

The upper deck surface 111 (reference surface) as a fastening surface to a cylinder head (not illustrated) is provided to an upper end of the upper block 110. The crankshaft bearing hole 130 is in a position apart from the upper deck surface 111.

Figure 7:
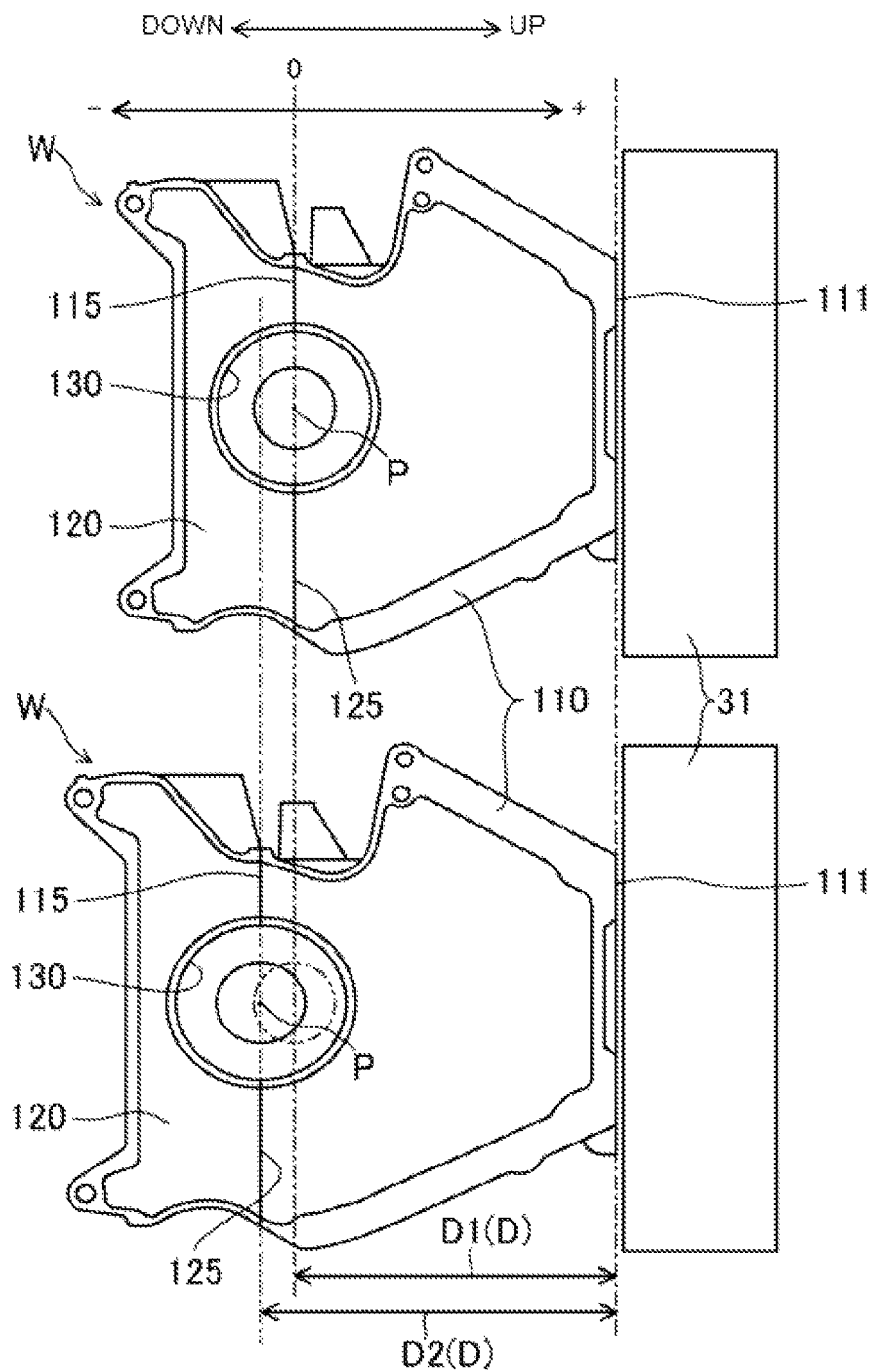
FIG. 7 is a diagram for explaining a change in a processing position of a crankshaft bearing hole from an upper deck surface due to thermal expansion.

Here, a description will be made about a processing position of the crankshaft bearing hole 130 and an influence of thermal expansion of the workpiece W with reference to FIG. 5 and FIG. 7. Note that FIG. 7 is a diagram, as seen from the front, of a state where the cylinder block as the workpiece W is fixed to the jig body 31. In FIG. 7, the upper diagram illustrates the workpiece W which has not yet thermally expanded, and the lower diagram illustrates the workpiece W which has already thermally expanded.

As illustrated in FIG. 5 and FIG. 7, the processing position of the crankshaft bearing hole 130 is determined with a distance D from the upper deck surface 111 to the center axis P of the crankshaft bearing hole 130. This distance D influences a reciprocating motion distance of a piston of the engine. That is, a design value which realizes a desired compression ratio is defined for this distance D. When an actual distance D largely deviates from the design value, the reciprocating motion distance of the piston fluctuates, and this might result in a fluctuation in the compression ratio. Consequently, it is desirable that in a finished product, an error between the actual distance D from the upper deck surface 111 to the crankshaft bearing hole 130 and the design value be as small as possible.

However, in processing of the cylinder block, other than processing of the crankshaft bearing hole 130, processing of opening fine holes, threading processing, finishing processing of a flat surface, processing of assembling parts of a product, and so forth are performed in different positions from the crankshaft bearing hole 130. Consequently, the temperature of the whole workpiece W can rise while the crankshaft bearing hole 130 and other sections are processed. Then, as illustrated in FIG. 7, the whole workpiece W expands. Hypothetically, the design value of the distance D from the upper deck surface 111 to the center axis P of the crankshaft bearing hole 130 is set as D1. Then, when in the expanded workpiece W, the crankshaft bearing hole 130 is processed in the position at the distance D1, that is, the position of the circle of a two-dot chain line in the lower diagram of FIG. 7, the position of the crankshaft bearing hole 130 moves in a positive direction from the position at the distance D1 in the finished product, that is, in a state where the cylinder block is cooled to a certain temperature. In other words, the distance D from the upper deck surface 111 to the center axis P of the crankshaft bearing hole 130 might become shorter than the design value D1. Consequently, in a state where the workpiece W has expanded, the processing position of the crankshaft bearing hole 130 has to be corrected to the position at a distance D2 in consideration of the expansion amount.

As described above, the processing position of the crankshaft bearing hole 130 relates to the compression ratio of the engine and is thus very important, and in the present specification, the crankshaft bearing hole 130 will be referred to as section to be corrected. Further, the above-described processing (such as processing of opening fine holes, threading processing, finishing processing of a flat surface, and processing of assembling parts of a product) other than processing of the crankshaft bearing hole 130 does not request correction of processing positions. Thus, those processed sections will be referred to as sections not to be corrected (first sections).

<Control Method>

Figure 8:
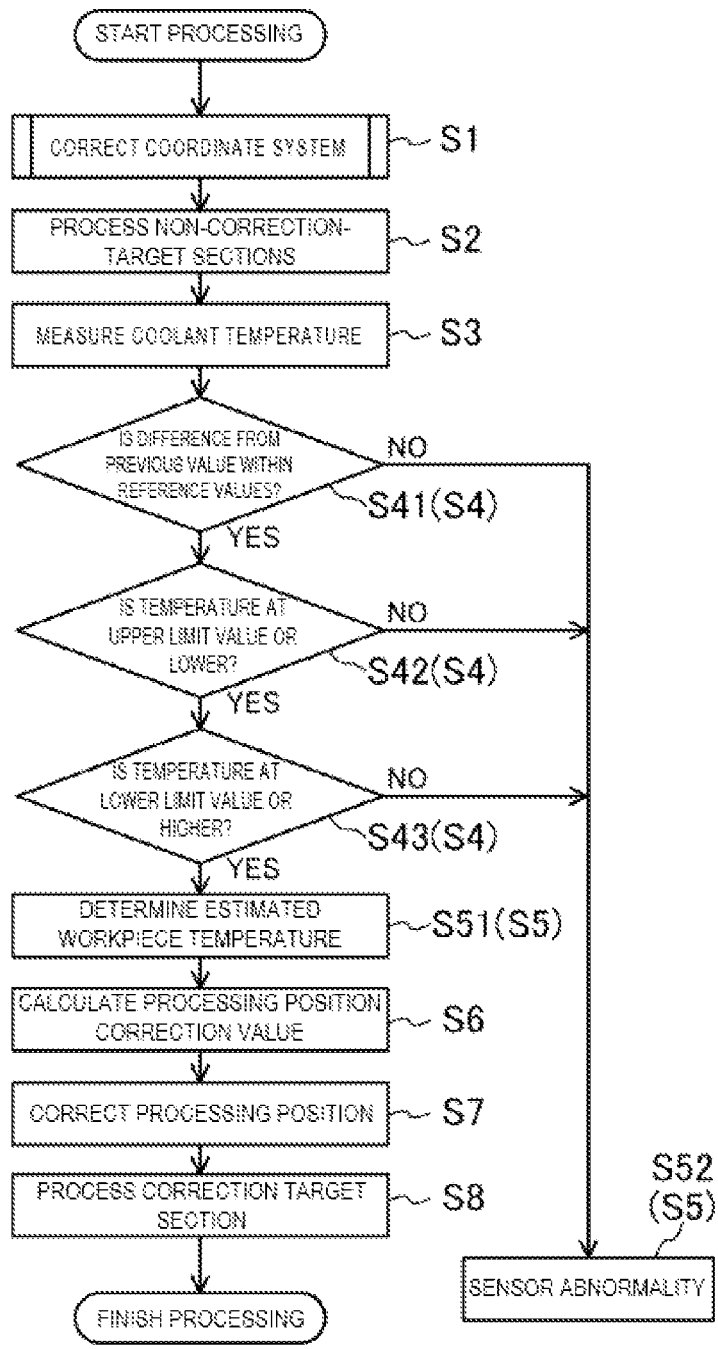
FIG. 8 illustrates a flow of a control method of the machining center.
Figure 9:
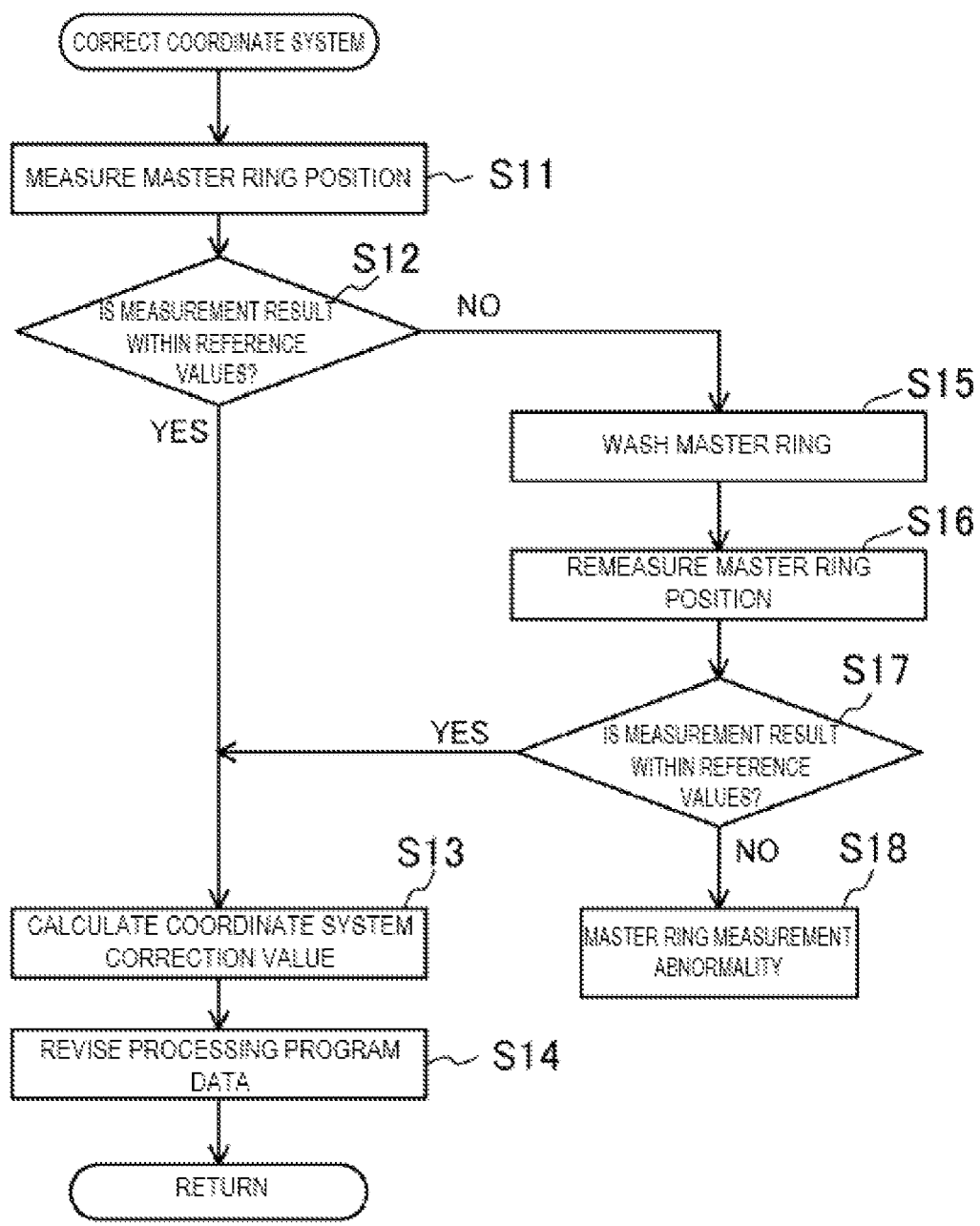
FIG. 9 is a flow of a coordinate system correction step.

Next, a control method of the machining center 1 will be described. As illustrated in FIG. 8 and FIG. 9, the control method of the machining center 1 includes the coordinate system correction step S1, a section-not-to-be-corrected processing step S2, a coolant temperature measurement step S3, a coolant temperature assessment step S4, an estimated workpiece temperature determination step S5 (calculation step), a processing position correction value calculation step S6 (calculation step), a processing position correction step S7 (correction step), and a section-to-be-corrected processing step S8 (second section processing step).

—Coordinate System Correction Step—

First, in an initial position of the machining center body 10, the jig 18 is fixed onto the processing table 20 of the machining center body 10 such that the master ring 40 of the jig body 31 is opposed to the spindle 14 (see FIG. 2). Specifically, in the initial position, the jig 18 is fixed to the processing table 20 such that the center line Cm of the master ring 40 becomes parallel with the Z-axis direction. Then, the workpiece W is fixed by the clamping apparatuses such that the upper deck surface 111 is arranged in the position of the reference character B in FIG. 3.

In order to precisely process the workpiece W, the position coordinates of the jig 18 retaining the workpiece W in the XYZ coordinate system and the coordinates of a reference point have to be detected, and processing has to be executed based on the detected coordinates.

That is, the coordinate system correction step S1 is a step of correcting the XYZ coordinate system of the jig 18. Processing precision of the workpiece W is improved by correcting expansion of shafts of ball screws of the machining center body 10 itself and non-uniformity in positions of the jig 18 itself. Specifically, for example, the position of the master ring 40 is detected by using the above-described touch sensor, the deviation amount between the detected coordinate position data and the coordinates of a predetermined jig arrangement position is calculated, and the processing program data 421 is thereby corrected based on the deviation amount.

One example of the coordinate system correction step S1 is illustrated in FIG. 9. First, the touch sensor as the tool 12 is attached to the spindle 14, and the position of the master ring 40 is detected by a distal end of the touch sensor (master ring position measurement step S11). Detected position information of the master ring 40 is stored as the position data 422 in the storage unit 420 (see FIG. 4). Then, it is assessed whether the position data 422 are included within a range of reference values (master ring position assessment step S12).

In a case where the position data 422 are included within the range of the reference values, the deviation amount between the detected position data 422 and the coordinates of a predetermined jig arrangement position, that is, a coordinate system correction value is calculated (coordinate system correction value calculation step S13). Calculated coordinate system correction value information is stored as the coordinate system correction value data 424 in the storage unit 420. Then, the processing program data 421 are revised based on the coordinate system correction value data 424 (processing program data revision step S14). Then, the flow progresses to the next section-not-to-be-corrected processing step S2.

On the other hand, when the detected position data 422 are out of the range of the reference values, the master ring 40 is washed (master ring washing step S15). Then, the position data 422 of the washed master ring 40 are again detected by the touch sensor (master ring position remeasurement step S16). Then, it is again assessed whether the position data 422 detected again are included within the range of the reference values (master ring position reassessment step S17). When the position data 422 are within the range of the reference values, the flow progresses to the coordinate system correction value calculation step S13. When the position data 422 are out of the range, an action of the machining center 1 is stopped due to a master ring measurement abnormality (S18).

Note that for example, as a method disclosed in Japanese Patent No. 5272598, a method may be employed which performs correction with higher precision by combining the touch sensor and a small tester or the like with higher detection precision and higher reliability than the touch sensor.

—Section-not-to-be-Corrected Processing Step—

As described above, the processing program data 421 are described such that the machining center body 10 processes the sections not to be corrected of the workpiece W and the crankshaft bearing hole 130 as the section to be corrected in this order. Consequently, when the coordinate system correction step S1 is finished, processing of the sections not to be corrected is started following program contents of the processing program data 421 (section-not-to-be-corrected processing step S2). As described above, the sections not to be corrected are sections to be subjected to processing, such as processing of opening fine holes, threading processing, finishing processing of a flat surface, and processing of assembling parts of a product. In the section-not-to-be-corrected processing step S2, all of those processes may be finished or may not have to be finished. In a case where not all processes are finished, although not illustrated in FIG. 8, processing of the remaining sections not to be corrected can be performed after the section-to-be-corrected processing step S8 is finished.

—Coolant Temperature Measurement Step—

The temperature of the coolant at a time when or after a predetermined time has elapsed after the processing work by the machining center 1 has been started, that is, an action of the coordinate system correction step S1 has been started is detected by the temperature sensor 204 (coolant temperature measurement step S3). Specifically, the coolant temperature is monitored by the temperature sensor 204 from a start of an action of the machining center 1 to a finish of the action. Then, the temperature data 423 are taken into the control apparatus 400 as a macro variable of the machining center 1, for example, and are stored in the storage unit 420. Then, among the temperature data 423 stored in the storage unit 420, the temperature of the coolant at a time when or after the predetermined time has elapsed after processing has been started, that is, the action of the coordinate system correction step S1 has been started is used in the next step. Note that details of the above predetermined time will be described later.

—Coolant Temperature Assessment Step—

In the coolant temperature assessment step S4, as for the temperature of the coolant at a time when or after the predetermined time has elapsed after the action of the above-described coordinate system correction step S1 has been started, it is assessed whether the difference between the above temperature and an estimated workpiece temperature at a previous action of the machining center 1, the estimated workpiece temperature being described later, is within reference values (S41). Further, it is assessed whether the temperature of the coolant is at an upper limit value or lower and a lower limit value or higher (S42 and S43). Note that although not intended to limit it, the reference value can be set such that the difference from the estimated workpiece temperature at the previous action is within ±5° C., for example. Further, although not intended to limit it, the upper limit value can be set as about 40° C., for example, in consideration of the action of the machining center 1 under a high temperature environment in the summer. Then, although not intended to limit it, the lower limit value can be set as about 17° C., for example, in consideration of the action of the machining center 1 under a low temperature environment in the winter.

—Estimated Workpiece Temperature Determination Step—

In a case where the temperature of the coolant is within the reference values and is at the upper limit value or lower and the lower limit value or higher, in the estimated workpiece temperature determination step S5, the calculation unit 411 estimates the above temperature of the coolant to be the temperature of the workpiece W itself at a time when or after the predetermined time has elapsed after the action of the coordinate system correction step S1 has been started (S51). In the present specification, the temperature of the workpiece W itself estimated in such a manner will be referred to as estimated workpiece temperature.

On the other hand, in a case where the coolant temperature is out of the reference value or higher than the upper limit value or lower than the lower limit value, this case is assessed to be an abnormality of the temperature sensor 204, and the action of the machining center 1 stops (S52).

—Processing Position Correction Value Calculation Step—

Based on the estimated workpiece temperature determined as described above, the calculation unit 411 calculates a deformation amount of the workpiece W due to thermal expansion, that is, calculates a processing position correction value (processing position correction value calculation step S6).

Specifically, a deformation amount ΔT (m) due to thermal expansion can be calculated by the following formula (1).

$$\Delta L = L \times \alpha \times \Delta T \quad (1)$$

However, in the formula (1), L denotes the length (m) of a material, a denotes a thermal expansion coefficient ($10^{-6}$/° C.), and ΔT denotes a temperature change amount (° C.). In the present embodiment, L corresponds to the distance D from the upper deck surface 111 to the center axis of the crankshaft bearing hole 130. A temperature change amount ΔT corresponds to the difference between a reference temperature of the design value of the workpiece W (specifically, for example, a room temperature) and the above estimated workpiece temperature.

The calculated deformation amount ΔL is stored as the processing position correction value data 425 in the storage unit 420.

—Processing Position Correction Step—

Based on the above calculated processing position correction value data 425, the correction unit 412 revises information of the processing position of the crankshaft bearing hole 130 from the upper deck surface 111 in the processing program data 421 (processing position correction step S7).

—Section-to-be-Corrected Processing Step—

Then, based on the corrected processing program data 421, by a command of the command unit 413, the machining center body 10 processes the crankshaft bearing hole 130 in the corrected processing position when or after the above-described predetermined time has elapsed (section-to-be-corrected processing step S8).

Note that the processing program data 421 are programmed such that the machining center body 10 performs processing of the crankshaft bearing hole 130 by using a short tool 311 (first tool) and thereafter performs additional processing of the crankshaft bearing hole 130 by using a long tool 312 (second tool) having a whole length longer than that of the short tool 311 (see FIG. 1).

Specifically, as indicated by two-dot chain lines in FIG. 1, the short tool 311 and the long tool 312 for processing the crankshaft bearing hole 130 of the workpiece W are caused to stand by in the tool magazine of the accommodation portion 301. Then, initial processing of the crankshaft bearing hole 130 is performed by the short tool 311 following the program contents of the processing program data 421. After processing is performed by the short tool for a certain time, the short tool 311 is changed to the long tool 312 by the ATC 300, and additional processing of a hole formed by the short tool 311 is performed.

Because the crankshaft bearing hole 130 has a shape which is long in a cylinder array direction, a tool 12 having a long whole length is needed for processing of that. However, when processing of the crankshaft bearing hole 130 is performed by using the long tool 12 from the beginning, it becomes difficult to secure accuracy of the processing position due to sagging or the like of the tool 12. In this configuration, initial processing of the long crankshaft bearing hole 130 is performed by the comparatively short short tool 311, and precision of the processing position can thereby be improved. Further, the initial processing is performed by the comparatively short short tool 311, a guide hole for the long tool 312 is thereby formed, and precision of the subsequent additional processing is improved.

Note that although the sizes and so forth of the short tool 311 and the long tool 312 are appropriately determined in accordance with a configuration of the workpiece W, as the short tool 311, a tool 12 with approximately one fifth of the length of the long tool 312 may be used, for example.

Then, at a time point when processing of all of the processed sections including the sections not to be corrected is finished, the processing work by the machining center 1 is finished.

<Characteristics, Work, and Effects>

Here, the control apparatus and the control method according to the present embodiment are characterized in that the predetermined time in the coolant temperature assessment step S4 is set to a time, which is defined in advance by an experimental procedure such as an experiment or a simulation analysis, for example, from a start of the processing work until the difference between the temperature of the vicinity of the crankshaft bearing hole 130 of the workpiece W and the temperature of the coolant falls within a predetermined range.

Figure 10:
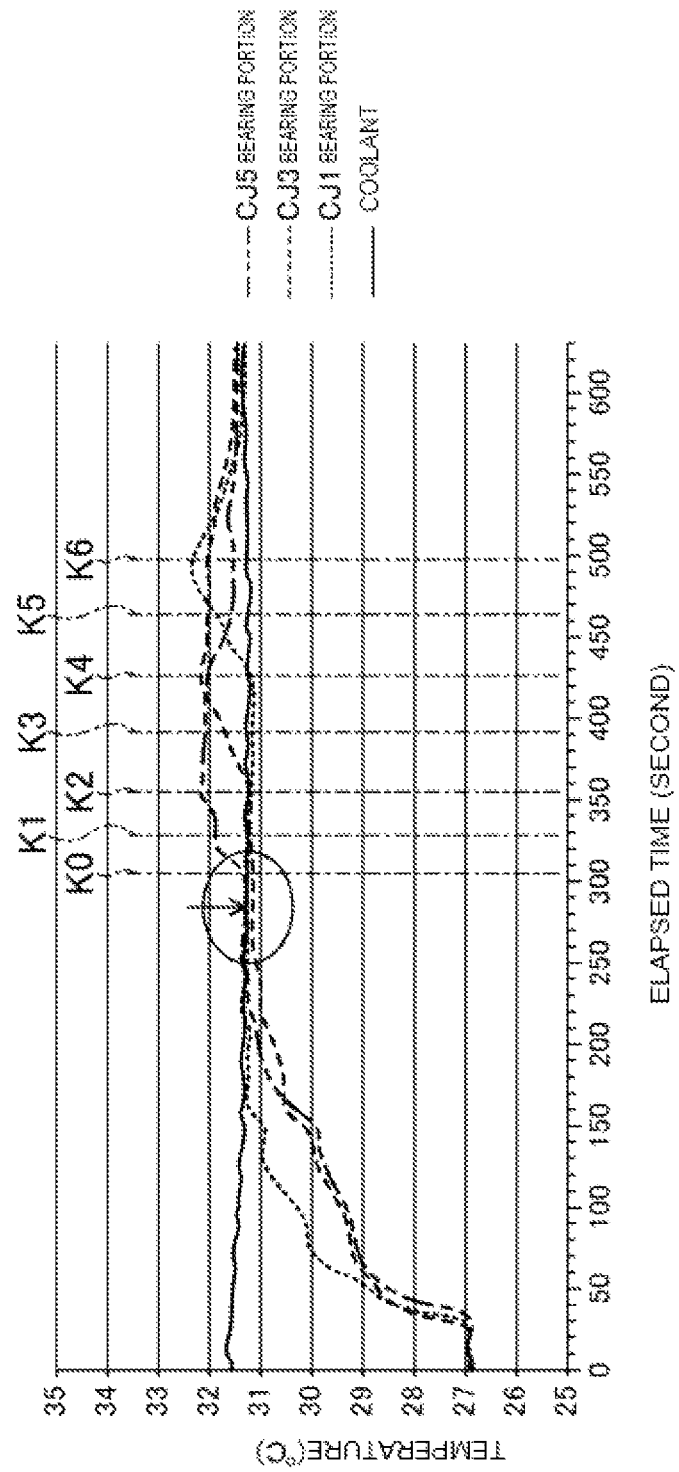
FIG. 10 is a graph illustrating time changes in temperatures of portions of a workpiece for verification and a coolant temperature.

In the following, a description will be made about one example of a method of defining the predetermined time by an experiment. In the vicinities of the crankshaft bearing hole 130 of the workpiece W for verification, specifically, to positions indicated by reference numerals 131, 133, and 135 in FIG. 5 (among the crank journals CJ of the crankshaft C illustrated as an example in FIG. 6, bearing portions in which a first crank journal CJ1, a third crank journal CJ3, and a fifth crank journal CJ5 are respectively arranged), thermocouples were welded, and the temperature of the workpiece W during processing by the machining center 1 was monitored. Further, the coolant temperature was monitored at the same time. Results of temperature changes with respect to the elapsed time are illustrated in FIG. 10. Note that the processing program data 421 are programmed to perform processing of the crankshaft bearing hole 130 after performing processing of all of the sections not to be corrected.

It may be understood that the coolant temperature is at an almost constant temperature from the start of processing to the finish of processing. On the other hand, it may be understood that as for the temperatures of the above three parts of the workpiece W, the temperatures gradually rise in response to processing of parts not to be corrected. Furthermore, as indicated by an arrow and a circle in FIG. 10, it may be understood that at a time point when approximately 250 to 300 seconds elapse from the start of processing, the temperatures of the above three parts of the workpiece W and the temperature of the coolant become almost the same, that is, the difference between the temperatures of the above three parts of the workpiece W and the temperature of the coolant falls within ±0.5° C. Further, by the verification by the inventors of the present application, it has been found that the time from the start of the processing work until the temperatures of the above three parts of the workpiece W become close to the temperature of the coolant is almost constant regardless of an ambient temperature.

Consequently, in the control apparatus and the control method according to the present embodiment, the temperature of the coolant at a time when or after the predetermined time has elapsed after the start of the processing work is determined as the estimated workpiece temperature, the processing position correction value is calculated, and the processing position of the crankshaft bearing hole 130 is corrected based on the processing position correction value. Accordingly, without measuring the temperature of the workpiece W itself, the processing position of the crankshaft bearing hole 130 can be corrected in consideration of the deformation amount of the workpiece W due to thermal expansion.

Further, in this configuration, because processing of the crankshaft bearing hole 130 is started after the temperature of the workpiece W becomes close to the temperature of the coolant, a fluctuation in the temperature of the workpiece W during processing of the crankshaft bearing hole 130 is inhibited to some extent, a deviation in the processing position becomes small, and precision of the processing position of the crankshaft bearing hole 130 can thereby be enhanced. Accordingly, an error in the compression ratio of the engine due to precision of the processing position of the crankshaft bearing hole can be reduced.

The predetermined time can fluctuate depending on kinds, models, and so forth of the workpiece W and is not limited to a particular time but can be set to approximately 250 to 300 seconds, for example, in the control apparatus and the control method according to the present embodiment. Note that setting of the predetermined time can be performed by setting of order of processed sections in the processing program data 421.

Specifically, for example, supposing that five sections not to be corrected are present, it is assumed that approximately 280 seconds have elapsed at a time point when processing of all of the five sections of the five sections not to be corrected has been finished after the start of the coordinate system correction step S1. Then, the processing program data 421 may be created such that the steps of the coolant temperature measurement step S3 to the section-to-be-corrected processing step S8 are performed after processing of all of the sections not to be corrected is finished.

Further, hypothetically, it is assumed that approximately 280 seconds have elapsed at a time point when processing of three sections, for example, of the five sections not to be corrected has been finished after the start of the coordinate system correction step S1. In this case, the processing program data 421 may be created such that the steps of the coolant temperature measurement step S3 to the section-to-be-corrected processing step S8 are performed after processing of all of the five sections not to be corrected is finished as in the above-described example. Further, the processing program data 421 may be created such that the steps of the coolant temperature measurement step S3 to the section-to-be-corrected processing step S8 are performed after processing of the above three sections is finished and although not illustrated in FIG. 8, processing of the remaining two sections not to be corrected is thereafter performed.

As described above, the processing program data 421 are programmed such that processing of the crankshaft bearing hole 130 is started when or after the predetermined time has elapsed after the start of the processing work.

The predetermined range of the difference between the temperature of the vicinity of the crankshaft bearing hole 130 of the workpiece W and the temperature of the coolant is preferably within ±1° C., further preferably within ±0.5° C. Accordingly, precision of the processing position of the crankshaft bearing hole 130 can further be enhanced.

Further, in the verification of FIG. 10, as indicated by a one-dot chain line of a reference character K0, around the part where the elapsed time exceeds 300 seconds, processing of the crankshaft bearing hole 130 by the short tool 311 from the crank journal CJ5 side is started. Furthermore, from the elapsed times indicated by one-dot chain lines of reference characters K1, K2, K3, K4, and K5, processing of respective bearing portions of crank journals CJ5, CJ4, CJ3, CJ2, and CJ1 by the long tool 312 is started in this order. Furthermore, at the elapsed time indicated by a one-dot chain line of a reference character K6, processing of the crankshaft bearing hole 130 has already been finished. The temperatures of the bearing portions of the crank journals CJ5, CJ3, and CJ5 increase by about 1° C. in response to the starts of processing of those bearing portions because a discharge pressure of the coolant from the distal end of the tool 12 is somewhat high. When the timings of temperature rises of the bearing portions are compared, it can be considered that the temperature rises locally occur and the temperature of the whole vicinity of the crankshaft bearing hole 130 which is being processed does not largely rise.

Second Embodiment

Other embodiments according to the present disclosure will hereinafter be described in detail. Note that in descriptions of those embodiments, the same reference characters will be given to the same portions as the first embodiment, and detailed descriptions will not be made.

In the above embodiment, a configuration is used in which setting of the predetermined time is performed by setting an order of the processed sections in the processing program data 421; however, this configuration is not restrictive. Specifically, for example, the control apparatus 400 may further include a time measurement apparatus which measures time from the start of the processing work of the workpiece W and which is not illustrated. Furthermore, the control apparatus 400 may cause the machining center body 10 to start processing of the crankshaft bearing hole 130 by using, as a trigger, a measurement signal of the time measurement apparatus, the measurement signal indicating a lapse of the predetermined time. The measurement signal of the time measurement apparatus is used as the trigger, and a start timing of processing of the crankshaft bearing hole 130 can thereby more easily be controlled. Note that time information of the time measurement apparatus is stored as time data in the storage unit 420.

OTHER EMBODIMENTS

In the above embodiment, a configuration is used in which the coolant temperature assessment step S4 is provided; however, this configuration is not restrictive, and the coolant temperature assessment step S4 may not have to be provided. In this case, the temperature of the coolant at a time when or after the predetermined time has elapsed after the start of the action of the coordinate system correction step S1, the temperature of the coolant being measured in the coolant temperature measurement step S3, can be determined, without any change, as the estimated workpiece temperature in the next estimated workpiece temperature determination step S5.

In the above embodiment, the temperature sensor 204 is arranged in the tank 202; however, the temperature sensor 204 is not limited to the above configuration as long as that can detect the temperature of the coolant and may be arranged in another position such as a position on the supply path 201.

The configuration of the control apparatus 400 of the above embodiment, which is illustrated in FIG. 4, is an example, and configurations other than the configuration illustrated in FIG. 4 may be included. Further, the configurations of the machining center body 10 and the ATC 300 of the above embodiment are examples, and the machining center body 10 and the ATC 300 are not limited to the above configurations. For example, the machining center body 10 of the above embodiment is of a lateral type and of a four-axis control type; however, the machining center body 10 may be of a vertical type or the like and of a three-axis control type, a five-axis control type, or another multi-axis control type. In the above embodiment, the ATC 300 is of a magazine type but may be of a turret type or the like.

In the above embodiment, a configuration is used in which processing of the crankshaft bearing hole 130 is performed by using the short tool 311 and the long tool 312; however, this configuration is not restrictive. Specifically, for example, in a case where the crankshaft bearing hole 130 is short, processing may be performed by a single tool 12. Processing may be performed by using three or more tools 12. A selection of the tools 12 can appropriately be changed in accordance with the configuration of the workpiece W.

In the verification of FIG. 10 in the above embodiment, a configuration is used in which processing of the crankshaft bearing hole 130 is performed from the side of the bearing portion of the fifth crank journal CJ5; however, this configuration is not restrictive, and processing may be performed from the side of the bearing portion of the first crank journal CJ1.

In the above embodiment, the workpiece W is a cylinder block of an engine for an automobile; however, this configuration is not restrictive. Specifically, the workpiece W is not limited to an automobile but may be a cylinder block of an engine for a vehicle or an engine for industry. Further, an engine is not limited to an in-line four-cylinder engine but may be a single cylinder engine or another multi-cylinder engine. Further, the workpiece W is not limited to a cylinder block but may be a cylinder head or the like. In a case of a cylinder head, a camshaft bearing hole corresponds to the second section. As described above, the workpiece W has a plurality of processing parts, and one of those is in a position apart from the reference surface. A control apparatus and a control method of the present disclosure can be applied to a workpiece to be subjected to processing in which the above position is specified by the distance from the reference surface.

EXAMPLES

In the following, a description will be made about a working example which was practically conducted.

Figure 11:
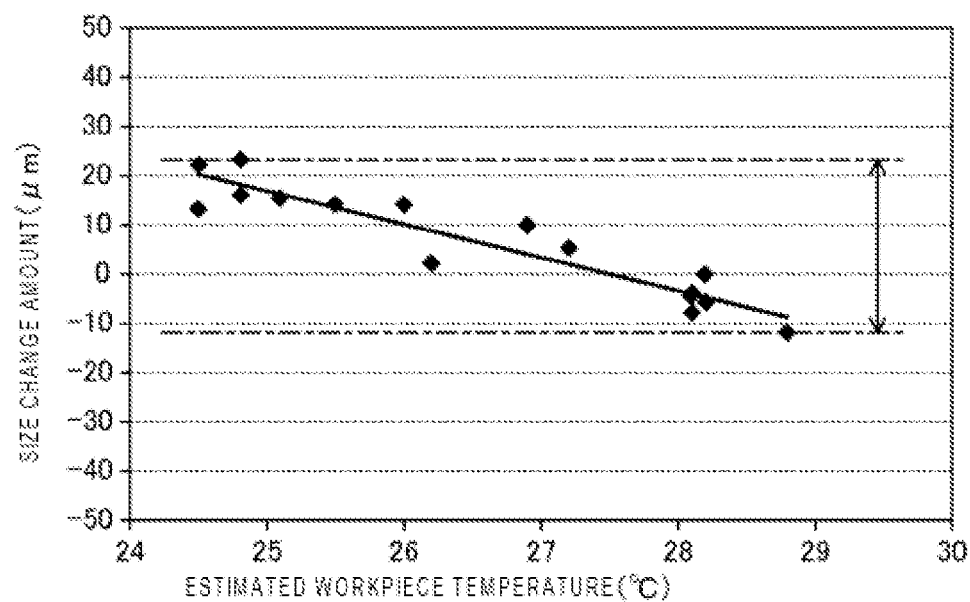
FIG. 11 is a graph representing the relationship between a coolant temperature and a size change amount of a comparative example.
Figure 12:
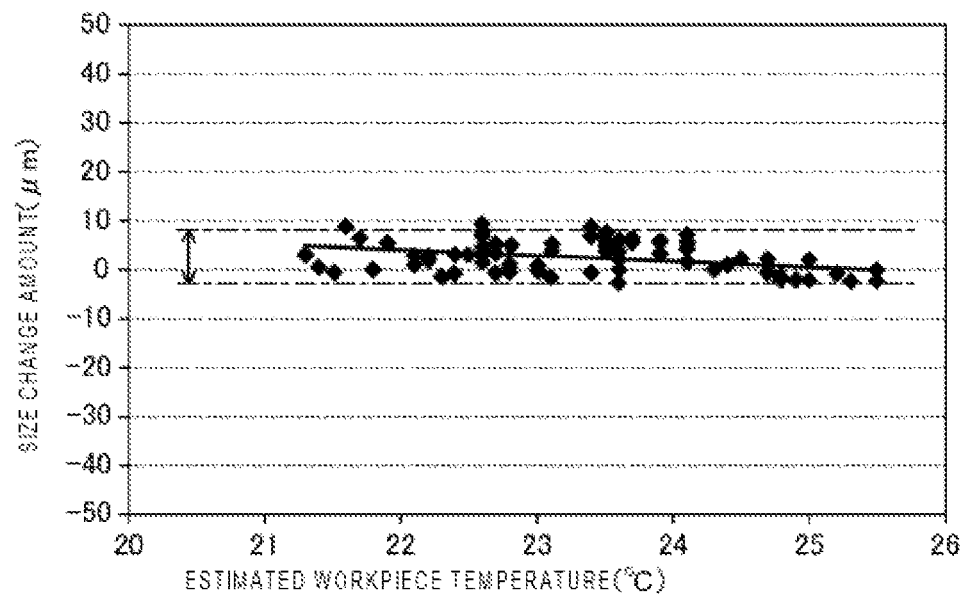
FIG. 12 is a graph representing the relationship between a coolant temperature and a size change amount of a working example.

FIG. 11 illustrates the relationship between a size change amount (μm) of the distance D and the estimated workpiece temperature (° C.) in a case, as a comparative example, where processing of a cylinder block as the workpiece W was performed without correcting the processing position of the crankshaft bearing hole 130. Specifically, processing of the crankshaft bearing hole 130 was performed in a manner such that after processing of all of the sections not to be corrected was performed in the section-not-to-be-corrected processing step S2 in FIG. 8, the flow progressed to the section-to-be-corrected processing step S8 without performing the steps of the coolant temperature measurement step S3 to the processing position correction step S7. Meanwhile, FIG. 12 illustrates the relationship between the size change amount of the distance D and the estimated workpiece temperature in a case, as a working example, where correction of the processing position of the crankshaft bearing hole 130 was performed as illustrated in FIG. 8. Note that in both of the comparative example and the working example, the estimated workpiece temperatures are the temperatures of the coolant at a time point when the section-not-to-be-corrected processing step S2 has been finished after the start of the processing work by the machining center 1 (when about 280 seconds have elapsed). Further, measurement of the size change amounts of the distance D was performed after the workpieces W for which processing was finished were cooled to 20° C. In addition, in FIG. 11 and FIG. 12, the design value of the distance D is set to zero.

As illustrated in FIG. 11, in the comparative example, the size change amount was non-uniform in a range of about 35 μm around the design value as zero. On the other hand, as illustrated in FIG. 12, in the working example, the range of non-uniformity was reduced to about 10 μm.

INDUSTRIAL APPLICABILITY

The present disclosure is very useful in fields of a control apparatus of a machining device and a control method of the same.

REFERENCE CHARACTERS LIST

1 machining center (machining device)
10 machining center body
110 upper block (cylinder block)
111 upper deck surface (reference surface)
120 lower block (cylinder block)
130 crankshaft bearing hole (second section)
200 coolant supply apparatus
204 temperature sensor (temperature detection apparatus)
311 short tool (first tool)
312 long tool (second tool)
400 control apparatus
411 calculation unit
412 correction unit
413 command unit
W workpiece

The invention claimed is:

1. A control apparatus of a machining device processing a first section of a workpiece and a second section in a position which is different from a position of the first section and which is apart from a reference surface of the workpiece in order of the first section and the second section, wherein
the machining device includes:
a coolant supply apparatus which supplies a coolant to the second section of the workpiece during processing work; and
a temperature detection apparatus which detects a temperature of the coolant,
the control apparatus comprises:
a calculation unit which estimates the temperature of the coolant at a time when a predetermined time elapses from a start of the processing work to be a temperature of the workpiece and calculates a deformation amount of the workpiece due to thermal expansion;
a correction unit which corrects a processing position of the second section with respect to the reference surface based on the deformation amount; and
a command unit which starts processing of the second section in the corrected processing position when the predetermined time elapses,
the predetermined time is a time defined in advance from the start of the processing work until a difference between a temperature of a vicinity of the second section of the workpiece and the temperature of the coolant falls within a predetermined range, and
the predetermined range of the difference between the temperature of the vicinity of the second section of the workpiece and the temperature of the coolant is within ±1° C.

2. The control apparatus of a machining device according to claim 1, wherein
the control apparatus comprises a time measurement apparatus which measures time from the start of the processing work, and
the command unit causes the machining device to start processing of the second section by using, as a trigger, a measurement signal of the time measurement apparatus, the measurement signal indicating a lapse of the predetermined time.

3. The control apparatus of a machining device according to claim 2, wherein
the workpiece is a cylinder block of an engine,
the reference surface is an upper deck surface as a fastening surface to a cylinder head, and
the second section is a crankshaft bearing hole.

4. The control apparatus of a machining device according to claim 3, wherein
the machining device includes a first tool and a second tool for performing processing of the crankshaft bearing hole, the second tool having a whole length longer than that of the first tool, and
the command unit causes the machining device to start processing of the crankshaft bearing hole by using the first tool and to subsequently perform additional processing of the crankshaft bearing hole by using the second tool.

5. The control apparatus of a machining device according to claim 1, wherein
the workpiece is a cylinder block of an engine,
the reference surface is an upper deck surface as a fastening surface to a cylinder head, and
the second section is a crankshaft bearing hole.

6. The control apparatus of a machining device according to claim 5, wherein
the machining device includes a first tool and a second tool for performing processing of the crankshaft bearing hole, the second tool having a whole length longer than that of the first tool, and
the command unit causes the machining device to start processing of the crankshaft bearing hole by using the first tool and to subsequently perform additional processing of the crankshaft bearing hole by using the second tool.

7. A control method of a machining device processing a first section of a workpiece and a second section in a position which is different from a position of the first section and which is apart from a reference surface of the workpiece in order of the first section and the second section, the machining device including a coolant supply apparatus which supplies a coolant to the second section of the workpiece during processing work, and a temperature detection apparatus which detects a temperature of the coolant, the control method comprising:
a calculation step of estimating the temperature of the coolant at a time when a predetermined time elapses from a start of the processing work to be a temperature of the workpiece and calculating a deformation amount of the workpiece due to thermal expansion;
a processing position correction step of correcting a processing position of the second section with respect to the reference surface based on the deformation amount; and
a second section processing step of starting processing of the second section in the corrected processing position after the processing position correction step, wherein
the predetermined time is a time defined in advance from the start of the processing work until a difference between a temperature of a vicinity of the second section of the workpiece and the temperature of the coolant falls within a predetermined range, and
the predetermined range of the difference between the temperature of the vicinity of the second section of the workpiece and the temperature of the coolant is within ±1° C.

8. The control method of a machining device according to claim 7, wherein
the workpiece is a cylinder block of an engine,
the reference surface is an upper deck surface as a fastening surface to a cylinder head, and
the second section is a crankshaft bearing hole.

9. The control method of a machining device according to claim 8, wherein
the machining device includes a first tool and a second tool for performing processing of the crankshaft bearing hole, the second tool having a whole length longer than that of the first tool, and
in the second section processing step, processing of the crankshaft bearing hole is performed by using the first tool, and additional processing of the crankshaft bearing hole is subsequently performed by using the second tool.

* * * * *